United States Patent
Nishimura et al.

(10) Patent No.: US 11,895,947 B2
(45) Date of Patent: Feb. 13, 2024

(54) MOWER WITH MOTOR COOLING ARRANGEMENT

(71) Applicant: HONDA MOTOR CO., LTD., Tokyo (JP)

(72) Inventors: Kenta Nishimura, Wako (JP); Yasumi Fukuzumi, Wako (JP); Yoshihiro Takahashi, Wako (JP); Koki Tsuruda, Wako (JP); Fumio Minami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 847 days.

(21) Appl. No.: 16/955,101

(22) PCT Filed: Dec. 22, 2017

(86) PCT No.: PCT/JP2017/046242
§ 371 (c)(1),
(2) Date: Jun. 18, 2020

(87) PCT Pub. No.: WO2019/123659
PCT Pub. Date: Jun. 27, 2019

(65) Prior Publication Data
US 2020/0383267 A1    Dec. 10, 2020

(51) Int. Cl.
*A01D 34/81* (2006.01)
*A01D 34/68* (2006.01)
(Continued)

(52) U.S. Cl.
CPC ............ *A01D 34/81* (2013.01); *A01D 34/68* (2013.01); *A01D 34/828* (2013.01); *A01D 75/18* (2013.01);
(Continued)

(58) Field of Classification Search
CPC ...... A01D 34/81; A01D 34/68; A01D 34/828; A01D 75/18; A01D 34/78; H02K 5/207; H02K 9/04
See application file for complete search history.

(56) References Cited

U.S. PATENT DOCUMENTS

| 4,276,737 A | 7/1981 | Henning |
| 6,666,008 B2 * | 12/2003 | Iida ......................... A01D 34/78 56/11.9 |
| 10,721,863 B2 * | 7/2020 | Uchimi .................. A01D 34/78 |

FOREIGN PATENT DOCUMENTS

| EP | 0481655 | 4/1992 |
| EP | 3659420 | 6/2020 |

(Continued)

OTHER PUBLICATIONS

International Search Report and Written Opinion for International Application No. PCT/JP2017/046242 dated Apr. 3, 2018, 9 pages.

(Continued)

*Primary Examiner* — Alicia Torres
(74) *Attorney, Agent, or Firm* — Amin, Turocy & Watson, LLP

(57) ABSTRACT

A mower comprises: a cutter housing having an inner hole in which an output shaft of a motor is inserted; and a motor cover provided above the cutter housing with a space therebetween, the motor cover covering the motor. Cooling air leadout openings for leading cooling air in the motor cover to the outside are formed in the motor cover, the cooling air leadout openings being positioned inward of a peripheral wall part of the motor cover and outward of the inner hole of the cutter housing.

6 Claims, 4 Drawing Sheets

(51) Int. Cl.
*A01D 34/78* (2006.01)
*A01D 75/18* (2006.01)
*H02K 9/04* (2006.01)
*H02K 5/20* (2006.01)
*A01D 34/82* (2006.01)
*A01D 101/00* (2006.01)

(52) U.S. Cl.
CPC ............... *H02K 5/207* (2021.01); *H02K 9/04* (2013.01); *A01D 34/78* (2013.01); *A01D 2101/00* (2013.01)

(56) References Cited

FOREIGN PATENT DOCUMENTS

| | | | | |
|---|---|---|---|---|
| GB | 2083733 A | * | 3/1982 | ............. A01D 34/81 |
| JP | 62-002993 | | 1/1987 | |
| JP | 5271517 | | 8/2013 | |
| JP | 5482291 | | 5/2014 | |

OTHER PUBLICATIONS

Extended European Search Report for European Patent Application No. 17935395.8 dated Dec. 9, 2020.

\* cited by examiner

MOWER WITH MOTOR COOLING ARRANGEMENT

TECHNICAL FIELD

The present invention relates to a lawn mower (mower) including a motor for rotating a cutter blade.

BACKGROUND ART

A lawn mower includes a motor for rotating a cutter blade for mowing the grass on lawns. The temperature of such a motor may become high depending on the conditions in which it is used. Accordingly, the lawn mower is provided with a cooling fan to cause a flow of cooling air inside the motor (see Japanese Patent No. 5482291, for example).

The lawn mower includes a motor cover accommodating the motor, and a ring-shaped cutter housing covering the cutter blade. A cooling air exit port is formed in the motor cover right under the motor. Cooling air that has cooled the motor is discharged into the cutter housing through the cooling air exit port and an inner hole of the cutter housing.

SUMMARY OF INVENTION

Incidentally, foreign matter, such as grass, dirt, dust, water, etc., is whirling in the cutter housing due to the wind generated as the cutter blade rotates. Even when the cooling air is discharged from the motor cover into the cutter housing through the cooling air exit port, the foreign matter in the cutter housing may flow into the motor cover through the inner hole of the cutter housing and the cooling air exit port. In particular, the foreign matter in the cutter housing is likely to flow into the motor cover when the lawn mower is started or stopped, because the current of cooling air guided out of the motor cover into the cutter housing is weak. As a result, the foreign matter may accumulate in the motor cover.

Furthermore, when the cutter blade and its vicinity (the inner surface of the cutter housing) are washed with the lawn mower turned over on its side, water may flow into the motor cover through the cooling air exit port.

The present invention has been devised taking such problems into consideration, and an object of the present invention is to provide a lawn mower that can efficiently cool the motor and can reduce the inflow of foreign matter into the motor cover.

In order to achieve the object above, the present invention is directed to a lawn mower including a motor configured to rotate a cutter blade, the lawn mower including: a cutter housing including an inner hole through which an output shaft of the motor is inserted; and a motor cover disposed above the cutter housing with a space interposed therebetween, the motor cover covering the motor, wherein the motor cover has formed therein at least one cooling air exit port configured to discharge cooling air in the motor cover to outside, and the at least one cooling air exit port is positioned inside a peripheral wall of the motor cover and outside the inner hole of the cutter housing.

According to this configuration, the cooling air exit port is positioned outside the inner hole of the cutter housing. The cooling air exit port is thus covered by the cutter housing from below. Accordingly, the cutter housing can reduce the inflow of foreign matter present in the cutter housing into the motor cover through the cooling air exit port. Further, the cooling air exit port is positioned inside the peripheral wall of the motor cover. Accordingly, the peripheral wall of the motor cover can reduce the inflow of foreign matter into the motor cover through the cooling air exit port from the outside of the cutter housing. Further, cooling air in the motor cover can be smoothly discharged into the cutter housing or to the outside from the cooling air exit port through the space between the motor cover and the cutter housing. It is thus possible to efficiently cool the motor and to reduce the inflow of foreign matter into the motor cover.

In the lawn mower above, left and right sides of the motor cover may be respectively provided with the at least one cooling air exit port.

According to the configuration above, when washing the cutter blade and its vicinity (the inner surface of the cutter housing) with the lawn mower turned over on its side, even if water flows into the motor cover from the cooling air exit port located on the upper side, the water can be discharged to the outside from the cooling air exit port located on the lower side. This prevents the interior of the motor from getting wet with the water.

In the lawn mower above, the at least one cooling air exit port may be directed outward in a radial direction of the motor.

This configuration can effectively reduce the inflow of foreign matter present in the cutter housing into the motor cover through the cooling air exit port.

In the lawn mower above, the at least one cooling air exit port may be positioned radially outside the motor.

According to the configuration above, even if foreign matter flows into the motor cover from the cooling air exit port, it is possible to prevent the foreign matter from contacting the motor.

In the lawn mower above, an inner bottom surface of the motor cover may form an inclined surface that is inclined downward from the side where the motor is positioned toward the at least one cooling air exit port.

According to the configuration above, even if foreign matter accumulates on the inclined surface, the accumulated foreign matter can be efficiently discharged by the cooling air to the outside of the motor cover.

In the lawn mower above, the motor cover may include a lower cover covering the motor from below, and an upper cover that is configured to be attached to and removed from the lower cover and that covers a side of the motor.

According to the configuration above, the motor cover can be easily disassembled into the lower cover and the upper cover, allowing maintenance work of the lawn mower to be performed smoothly.

DESCRIPTION OF EMBODIMENTS

The lawn mower according to the present invention will be described below referring to the accompanying drawings in conjunction with preferred embodiments.

Figure 1:
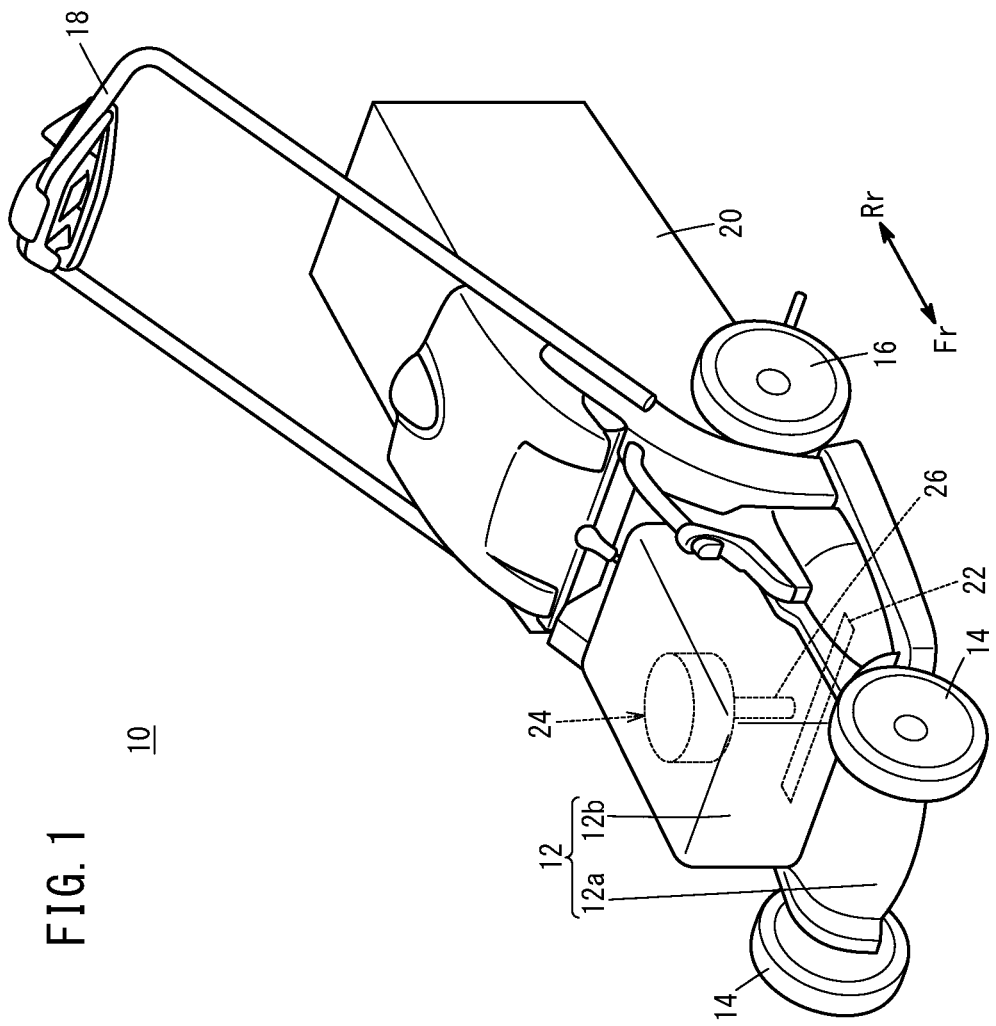
FIG. 1 is a perspective view illustrating a lawn mower according to an embodiment of the present invention.

As shown in FIG. 1, a lawn mower 10 is a walk-type lawn mower for cutting the grass on lawns. In FIG. 1, the arrow Fr shows the forward direction of the lawn mower 10 (the same direction as the forward direction seen from an operator), and the arrow Rr shows the rearward direction of the lawn mower 10 (the same direction as the rearward direction seen from the operator).

In the lawn mower 10, a motor 24 for rotating a cutter blade 22 is cooled by causing cooling air to flow into the motor 24. The lawn mower 10 includes a housing 12, left and right front wheels 14 disposed in the front part of the housing 12, left and right rear wheels 16 disposed in the rear part of the housing 12, an operation handle 18 extending rearward from the housing 12, and a mown grass storage 20 attached at the rear of the housing 12.

The housing 12 includes a cutter housing 12a and a main housing body 12b. The cutter housing 12a is a casing that is opened downward only in a part facing the ground (lawn). The cutter housing 12a contains the mowing cutter blade 22 (see FIGS. 1 and 3). The cutter blade 22 is coupled to an output shaft 26 of the motor 24 through a blade holder not shown. The cutter blade 22 is a plate-like elongated member (so-called bar blade).

Figure 2:
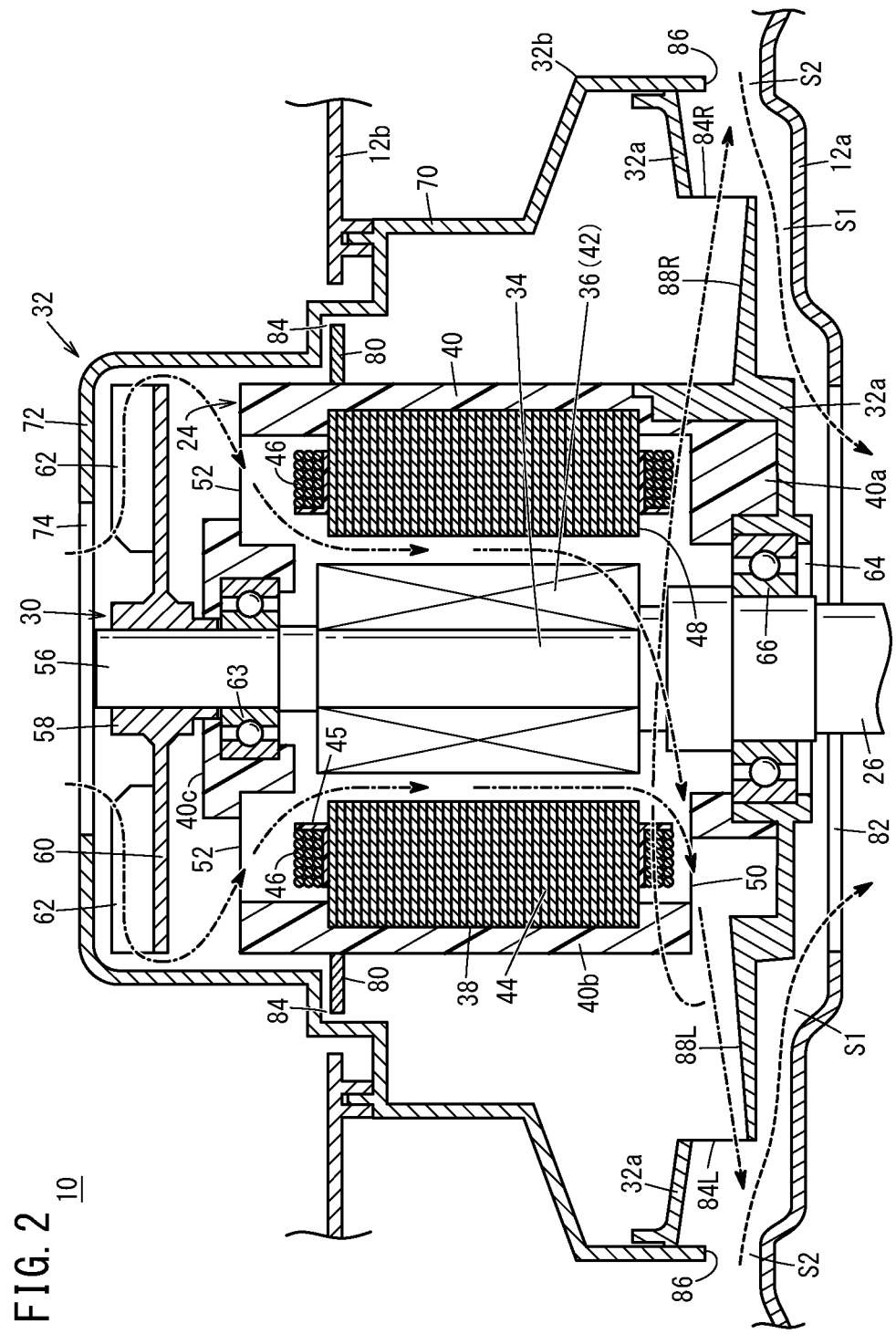
FIG. 2 is a partially omitted longitudinal cross section showing a main part of the lawn mower of FIG. 1.

The main housing body 12b is provided with an air intake port (not shown) for introducing cooling air (outside air) into the main housing body 12b. As shown in FIG. 2, the housing 12 contains the motor 24 serving as a driving source of the cutter blade 22 (see FIG. 3) and the rear wheels 16, a centrifugal fan 30 (cooling fan) attached to the motor 24, and a motor cover 32 accommodating the motor 24 and the centrifugal fan 30.

The motor 24 is driven by electric power supplied from a battery not shown. The motor 24 is constructed as a so-called inner-rotor type motor. The motor 24 includes a motor rotary shaft 34, a rotor 36, a stator 38, and a motor housing 40.

The motor rotary shaft 34 extends in a substantially vertical direction. The output shaft 26 projecting below the motor housing 40 is coupled to the lower end of the motor rotary shaft 34. The output shaft 26 extends into the cutter housing 12a. The driving force generated by the motor 24 is transmitted to the left and right rear wheels 16 as a travel driving force through a travel power transmission mechanism (not shown) coupled to the output shaft 26. The driving force generated by the motor 24 may be transmitted to the left and right front wheels 14.

The rotor 36 has permanent magnets 42 arranged at the outer circumferential surface of the motor rotary shaft 34. The permanent magnets 42 are arranged such that the N- and S-poles are disposed alternately in the circumferential direction of the motor rotary shaft 34.

The stator 38 includes an iron core 44 formed of a stack of multiple steel sheets, and a plurality of stator coils 46 attached to the iron core 44 through an insulator 45. The iron core 44 has a plurality of salient poles (poles) 48 protruding radially inward from its outer circumferential portion. The plurality of salient poles 48 are arranged at equal intervals in the circumferential direction of the stator 38. The stator coils 46 are formed by winding conducting wires around the salient poles 48 with the insulator 45 therebetween.

The motor housing 40 is disposed coaxially with the motor rotary shaft 34. The motor housing 40 is provided in the motor cover 32 and supports the stator 38. The motor housing 40 includes a bottom wall 40a positioned below the stator 38, a side wall 40b projecting upward from the bottom wall 40a so as to cover the outer circumferential surface of the stator 38, and a top wall 40c provided at the top end of the side wall 40b. The bottom wall 40a has formed therein a cooling air discharge outlet 50 for discharging the cooling air in the motor 24 to the outside. The top wall 40c has formed therein a cooling air inlet 52 for taking the cooling air into the motor 24. The cooling air inlet 52 is positioned above the stator 38.

The centrifugal fan 30 is disposed above the motor 24 and sends cooling air into the motor 24. The centrifugal fan 30 includes a fan rotary shaft 56, a hub 58, a base 60, and blades 62. The fan rotary shaft 56 is rotatably supported by a bearing 63 provided in the top wall 40c in such a manner that the fan rotary shaft 56 projects upward from the top end of the motor rotary shaft 34. That is, the centrifugal fan 30 is disposed coaxially with the motor rotary shaft 34 and rotates integrally with the motor rotary shaft 34.

The hub 58 is formed like a cylinder and fixed to the fan rotary shaft 56. The base 60 is a plate-like member provided on the outer circumferential surface of the hub 58. The base 60 is formed like a circular ring. The base 60 covers the entirety of the cooling air inlet 52 from above.

The plurality of blades 62 are provided on the upper surface of the base 60. Each blade 62 extends from the inner circumferential portion of the base 60 to the outer edge of the base 60. Each blade 62 extends radially outward, curving in the rotating direction of the base 60.

The motor cover 32 includes a lower cover 32a and an upper cover 32b that can be attached to and removed from the lower cover 32a. The lower cover 32a is attached to the upper cover 32b so as to cover the motor 24 from below. The motor housing 40 is fixed to the lower cover 32a. The lower cover 32a has an insertion hole 64 through which the output shaft 26 passes, and a bearing 66 rotatably supporting the output shaft 26.

The upper cover 32b includes a peripheral wall 70 covering the motor 24 and the centrifugal fan 30 from the side, and an outer circumference cover portion 72 covering the outer circumferential portion of the centrifugal fan 30 from above. The peripheral wall 70 is fixed to the main housing body 12b. The lower cover 32a is provided along the entire perimeter of the lower end of the upper cover 32b.

The outer circumference cover portion 72 is provided at the top end of the peripheral wall 70. A cooling air introducing port 74 for introducing cooling air into the motor cover 32 is formed in the center portion of the outer circumference cover portion 72. The cooling air introducing port 74 has an outer diameter that is smaller than the outer diameter of the base 60 of the centrifugal fan 30.

A throttle member 80 for forming an orifice 84 is formed on the outside of the motor 24 in the motor cover 32. The throttle member 80 is a plate-like member formed like a circular ring and is fixed to the side wall 40b of the motor housing 40.

The lower cover 32a is disposed above the ring-shaped cutter housing 12a with a space S1 interposed therebetween, so as to cover the cutter blade 22 from above. The output shaft 26 is inserted through an inner hole 82 of the cutter housing 12a. The cutter housing 12a extends outward (radially outward) past the upper cover 32b.

Cooling air exit ports 84L, 84R are formed respectively on the left and right sides of the lower cover 32a, so as to guide cooling air in the motor cover 32 to the outside. The cooling air exit ports 84L, 84R are located inside the peripheral wall 70 of the motor cover 32 (a lower end 86 of the upper cover 32b) and outside the inner hole 82 of the cutter housing 12a. That is, the cooling air exit ports 84L, 84R are covered by the cutter housing 12a from below.

A space S2 through which air can flow is formed between the lower end 86 of the upper cover 32b and the cutter housing 12a. The space S2 communicates with the space S1. The cooling air exit ports 84L, 84R are directed outward in the radial direction of the motor 24. Specifically, the lower end 86 of the upper cover 32b is located at a height between the upper ends and the lower ends of the cooling air exit ports 84L, 84R. The lower ends of the cooling air exit ports 84L, 84R are located below the lower end 86 of the upper cover 32b. The cooling air exit ports 84L, 84R are located radially outside the motor 24.

Inclined surfaces 88L, 88R are formed respectively on the left and right sides of the inner surface of the lower cover 32a, the inclined surfaces 88L, 88R being inclined downward toward the cooling air exit ports 84L, 84R from the side on which the motor 24 is positioned.

Next, operations of the lawn mower 10 constructed as above will be described.

With the lawn mower 10 shown in FIG. 1, when the cutter blade 22 rotates clockwise in plan view under the driving action of the motor 24, the cutter blade 22 cuts the grass growing on the lawn right beneath the lawn mower 10. At this time, an air current (swirling wind) swirling in the same direction as the cutter blade 22 is generated inside the cutter housing 12a. Then, the cut grass (mown grass) is sent into the mown grass storage 20 by the conveying wind (swirling wind) thus generated. At this time, foreign matter, such as grass, dirt, dust, water, etc., is whirling in the cutter housing 12a.

The centrifugal fan 30 rotates as the motor rotary shaft 34 rotates. Then, as shown in FIG. 2, outside air (air) is taken into the main housing body 12b, and the air inside the main housing body 12b is introduced as cooling air into the motor cover 32 through the cooling air introducing port 74.

The cooling air introduced into the motor cover 32 is pushed out radially outward by the blades 62 of the centrifugal fan 30 while swirling along the circumferential direction of the fan rotary shaft 56. Then, the cooling air guided by the action of the centrifugal fan 30 is guided to the back of the centrifugal fan 30 by the function of the orifice 84, and flows into the motor 24 through the cooling air inlet 52 formed in the top wall 40c of the motor housing 40.

The cooling air flowing into the motor 24 flows downward between the rotor 36 and the stator 38 and between the stator coils 46, thereby cooling the stator 38 (stator coils 46). The cooling air, which has cooled the stator 38, is discharged out of the motor housing 40 through the cooling air discharge outlet 50 and flows out of the motor cover 32 through the cooling air exit ports 84L, 84R.

The cooling air flowing out from the cooling air exit ports 84L, 84R is discharged out of the motor cover 32 through the space S1 between the cutter housing 12a and the lower cover 32a and the space S2 between the lower end 86 of the upper cover 32b and the cutter housing 12a. Also, while the lawn mower 10 is operating, outside air is introduced into the cutter housing 12a from the space S2 through the space S1 between the lower cover 32a and the cutter housing 12a. Accordingly, part of the cooling air flowing out from the cooling air exit ports 84L, 84R flows into the cutter housing 12a together with the air introduced into the cutter housing 12a from the space S2.

Figure 3:
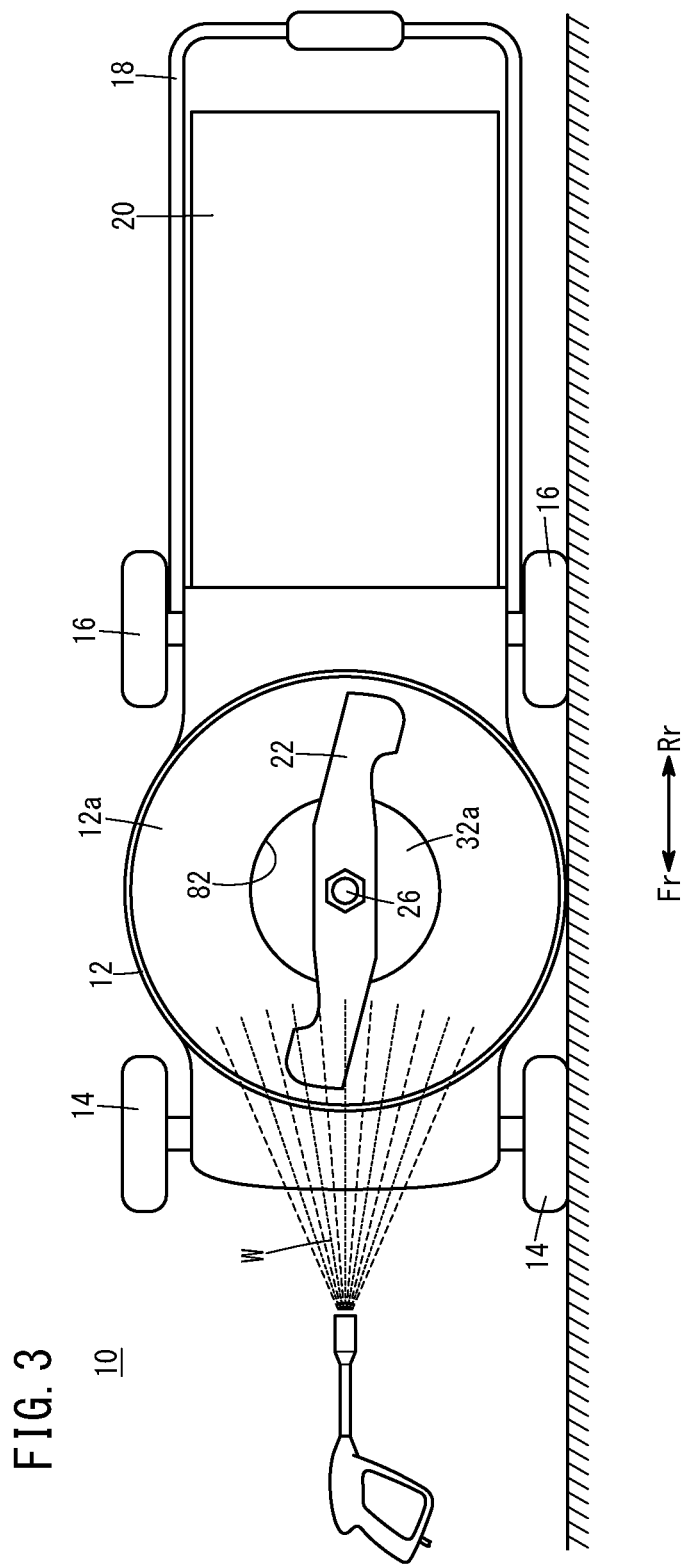
FIG. 3 is a perspective view of the lawn mower illustrating the lawn mower turned over on its side in order to wash a cutter blade and its vicinity.

When the lawn mower 10 cuts grass, the grass etc. adhere to the bottom of the lawn mower 10 (the cutter blade 22 and its vicinity) and so the bottom needs washing. For this purpose, as shown in FIG. 3, the operator turns over the lawn mower 10 on its side (directs the vehicle width direction of the lawn mower 10 along the vertical direction) so that water can be sprayed onto the bottom of the lawn mower 10.

Figure 4:
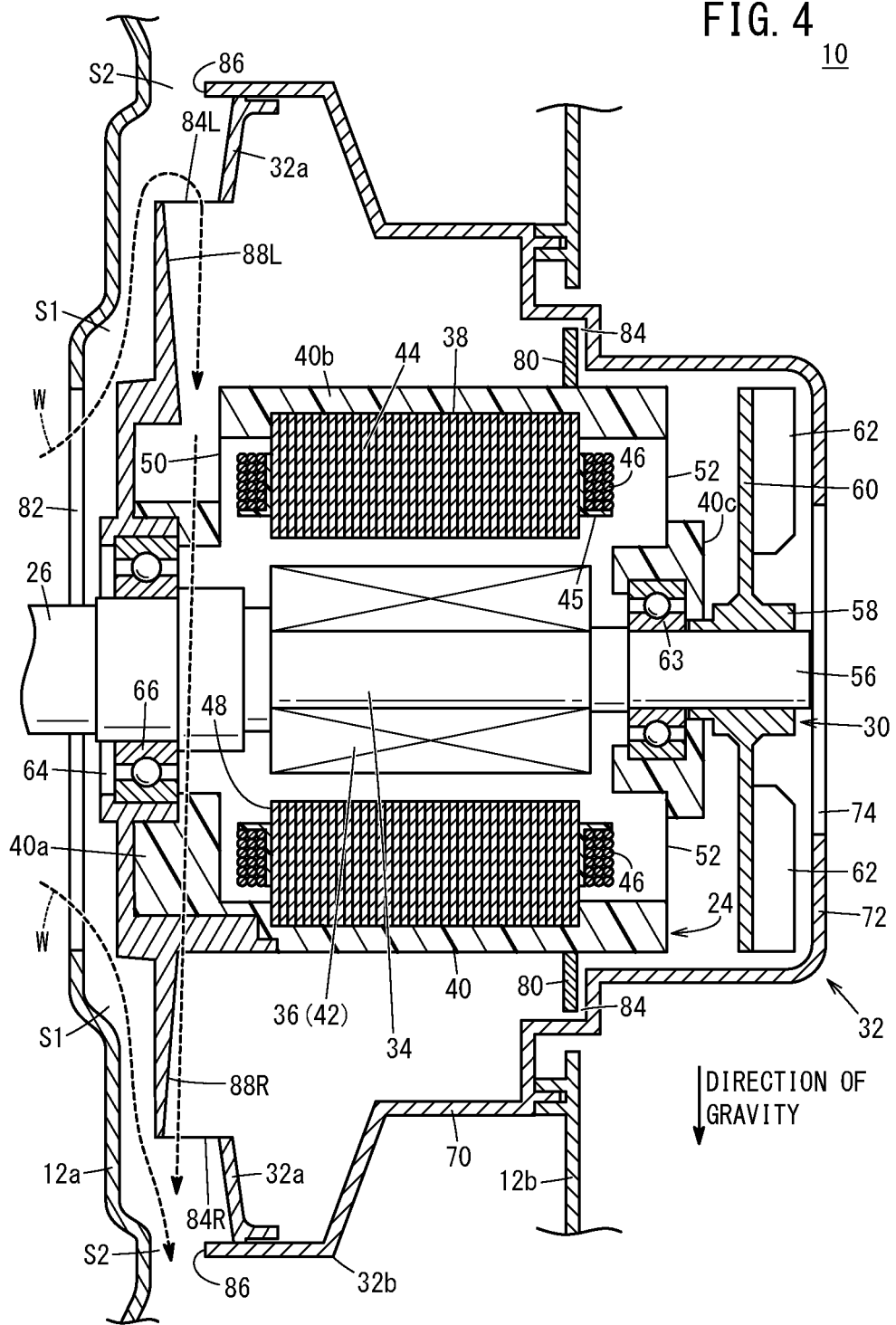
FIG. 4 is a partially omitted longitudinal cross section showing the main part of the lawn mower that is used to explain the flow of water in FIG. 3.

When the lawn mower 10 is thus lying sideways, the cooling air exit port 84L is located above the cooling air exit port 84R, for example (see FIG. 4). With the lawn mower 10 lying sideways in this manner, water W is sprayed onto the cutter blade 22 and its vicinity (the inner surface of the cutter housing 12a) to wash the cutter blade 22 and its vicinity with water W. In this work, the water W may flow into the space S1 between the cutter housing 12a and the lower cover 32a.

In this case, the lawn mower 10 according to this embodiment offers the effects below.

As shown in FIG. 2, the cooling air exit ports 84L, 84R are positioned outside the inner hole 82 of the cutter housing 12a. The cooling air exit ports 84L, 84R are thus covered by the cutter housing 12a from below. Accordingly, the cutter housing 12a can reduce the inflow of foreign matter present in the cutter housing 12a into the motor cover 32 through the cooling air exit ports 84L, 84R. The cooling air exit ports 84L, 84R are positioned inside the peripheral wall 70 of the motor cover 32. Accordingly, the upper cover 32b can reduce the inflow of foreign matter into the motor cover 32 through the cooling air exit ports 84L, 84R from the outside of the cutter housing 12a.

Further, the cooling air in the motor cover 32 can be smoothly discharged to the outside or into the cutter housing 12a from the cooling air exit ports 84L, 84R through the space S1 between the lower cover 32a and the cutter housing 12a. It is thus possible to efficiently cool the motor 24 and to reduce the inflow of foreign matter into the motor cover 32.

The cooling air exit ports 84L, 84R are provided respectively on left and right sides of the motor cover 32 (lower cover 32a). Then, as shown in FIGS. 3 and 4, when washing the cutter blade 22 and its vicinity (the inner surface of the cutter housing 12a) with the lawn mower 10 turned over on its side, even if water W flows into the motor cover 32 from the cooling air exit port 84L located on the upper side, the water W that has entered the motor cover 32 can be discharged to the outside from the cooling air exit port 84R located on the lower side (in the direction of gravity). This prevents the interior of the motor 24 from getting wet with the water.

Water W that enters from the inner hole 82 of the cutter housing 12a and flows in the space S1 between the cutter housing 12a and the motor cover 32 (lower cover 32a) downward to the cooling air exit port 84R is discharged to the outside from the space S2 between the lower end 86 of the peripheral wall 70 of the motor cover 32 and the cutter housing 12a. In this case, the water W does not flow into the cooling air exit port 84R since the cooling air exit port 84R is directed radially outward (in the downward direction with the lawn mower 10 lying sideways).

The cooling air exit ports 84L, 84R are directed outward in the radial direction of the motor 24. This can effectively reduce the inflow of foreign matter present in the cutter housing 12a into the motor cover 32 through the cooling air exit ports 84L, 84R.

The cooling air exit ports 84L, 84R are positioned radially outside the motor 24. Then, even if foreign matter flows into the motor cover 32 from the cooling air exit ports 84L, 84R, this configuration prevents the foreign matter from contacting the motor 24.

The inner bottom surface of the motor cover 32 (the inner surface of the lower cover 32a) forms the inclined surfaces 88L, 88R that are inclined downward from the side where the motor 24 is positioned toward the cooling air exit ports 84L, 84R, respectively. Then, even if foreign matter accumulates on the inclined surfaces 88L, 88R, the accumulated foreign matter can be efficiently discharged by the cooling air to the outside of the motor cover 32.

The motor cover 32 includes the lower cover 32a covering the motor 24 from below, and the upper cover 32b that can be attached to and removed from the lower cover 32a and that covers the side of the motor 24. The motor cover 32 can thus be easily disassembled into the lower cover 32a and the upper cover 32b, allowing maintenance work of the lawn mower 10 to be performed smoothly.

The present invention is not limited to the configurations described above. The motor 24 is not limited to inter-rotor type but may be of outer-rotor type. The throttle member 80 may be fixed to the peripheral wall 70 of the motor cover 32, with a space left between the throttle member 80 and the side wall 40b of the motor housing 40. In this case, the orifice 84 is formed between the throttle member 80 and the side wall 40b.

The cooling air exit ports 84L, 84R may be directed downward. A cooling air exit port extending in a circular ring shape may be formed in the lower cover 32a.

The lawn mower according to the present invention is not limited to the embodiments shown above but can of course adopt various configurations without departing from the essence and gist of the present invention.

What is claim is:

1. A lawn mower including a motor configured to rotate a cutter blade, the lawn mower comprising:
   a cutter housing including an inner hole through which an output shaft of the motor is inserted; and
   a motor cover disposed above the cutter housing with a space interposed therebetween, the motor cover covering the motor,
   wherein the motor cover has formed therein at least one cooling air exit port configured to discharge cooling air in the motor cover to outside, and
   the at least one cooling air exit port is positioned further inward than a peripheral wall of the motor cover,
   the at least one cooling air exit port is positioned further outward than the inner hole of the cutter housing in a radial direction of the motor, thereby the at least one cooling air exit port being covered by the cutter housing from below, and
   part of cooling air flowing out of the at least one cooling air exit port flows into the cutter housing via the space between the cutter housing and the motor cover.

2. The lawn mower according to claim 1, wherein left and right sides of the motor cover are respectively provided with the at least one cooling air exit port.

3. The lawn mower according to claim 1, wherein the at least one cooling air exit port is directed outward in the radial direction of the motor.

4. The lawn mower according to claim 1, wherein the at least one cooling air exit port is positioned further radially outward than the motor.

5. The lawn mower according to claim 1, wherein an inner bottom surface of the motor cover forms an inclined surface that is inclined downward from a side where the motor is positioned toward the at least one cooling air exit port.

6. The lawn mower according to claim 1,
   wherein the motor cover includes:
   a lower cover covering the motor from below; and
   an upper cover that is configured to be attached to and removed from the lower cover and that covers a side of the motor.

\* \* \* \* \*